Dec. 11, 1928.

C. P. EISENHAUER 1,694,467

FILTER

Filed Aug. 18, 1925

INVENTOR
CHARLES P. EISENHAUER

ATTORNEYS

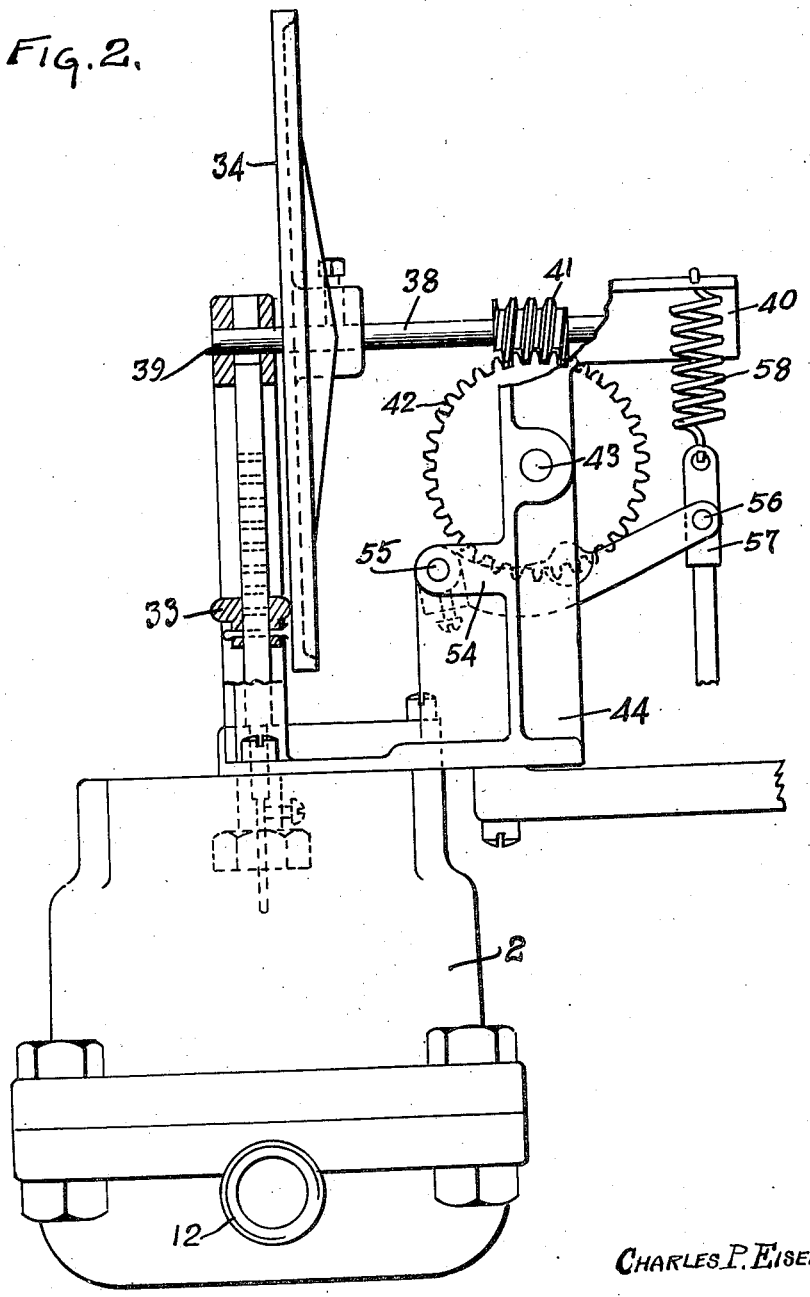

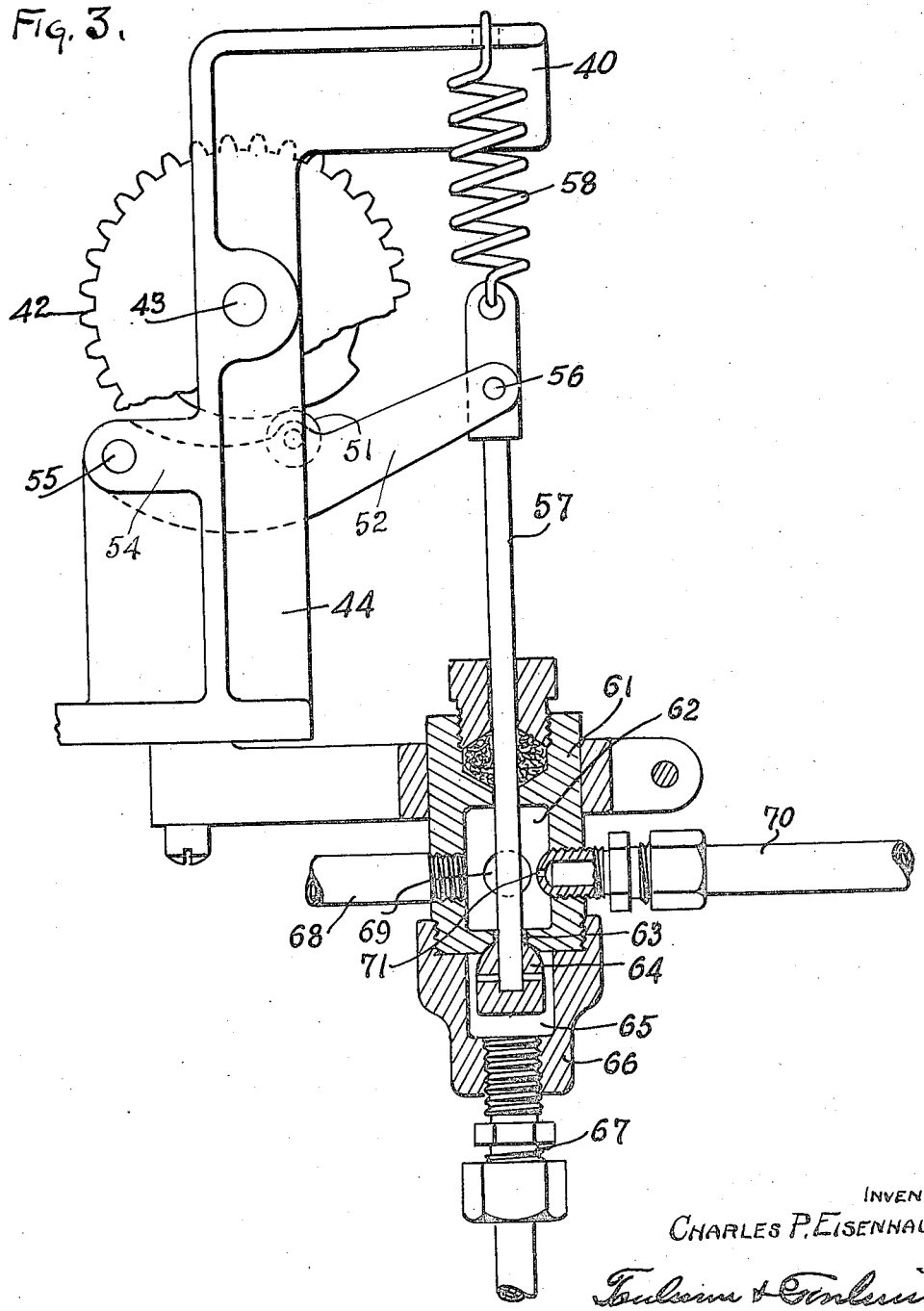

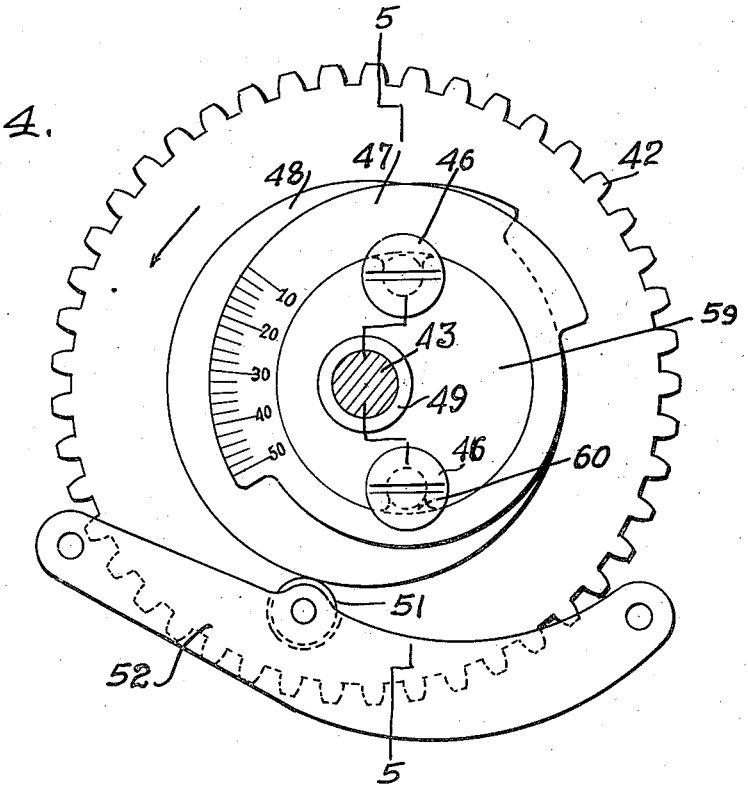
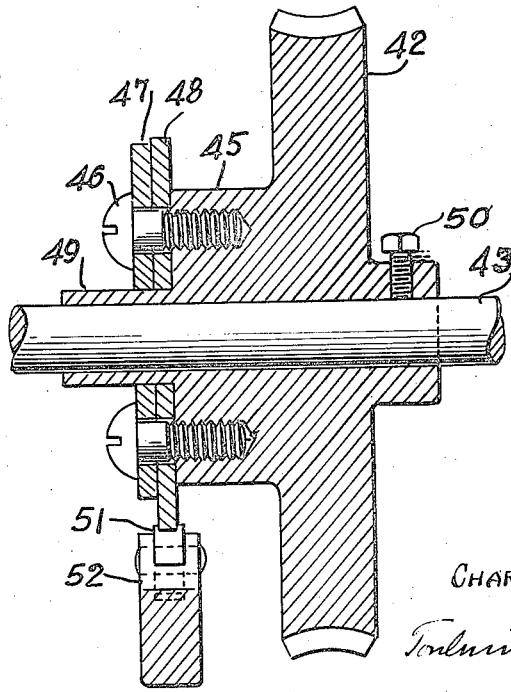

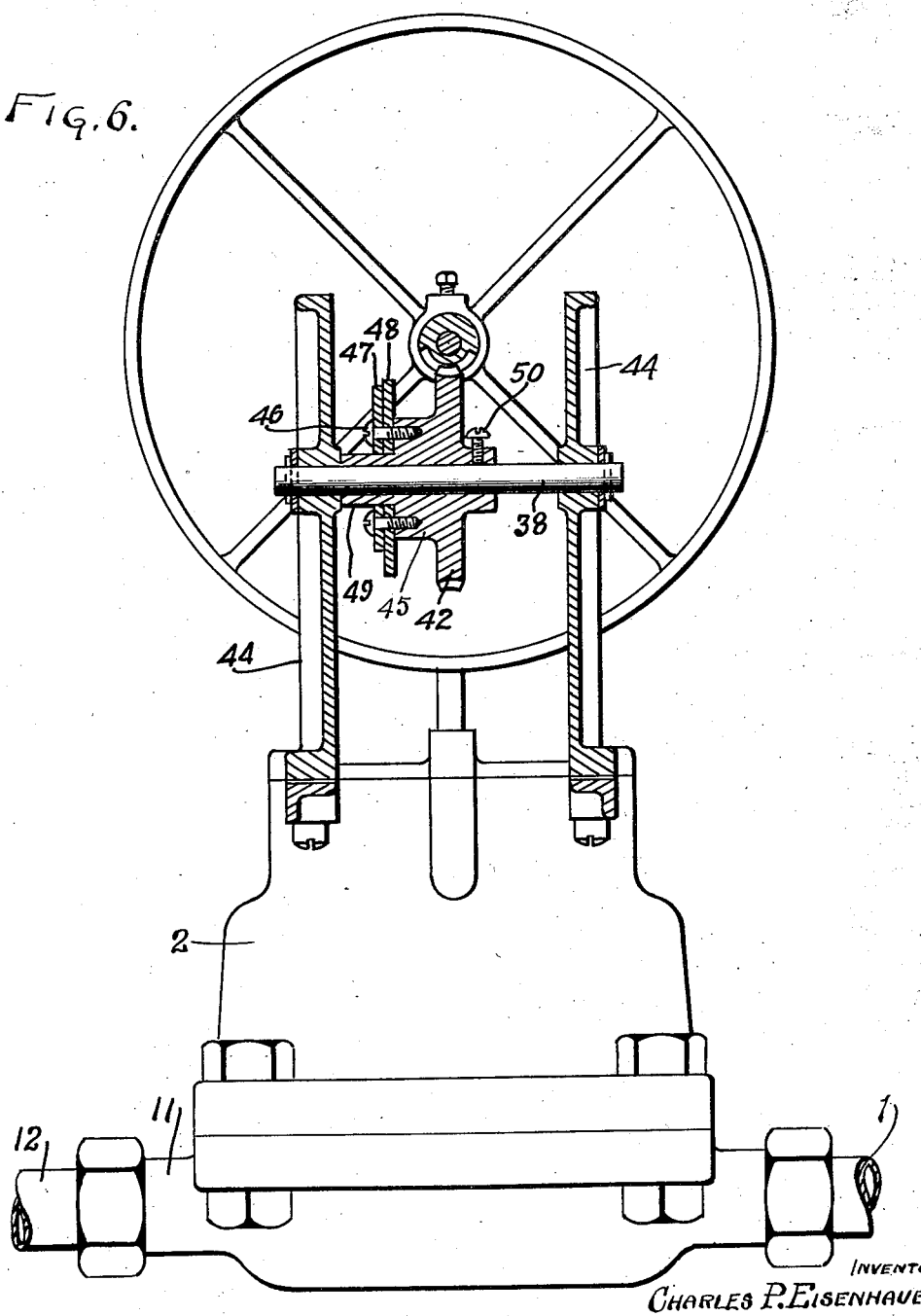

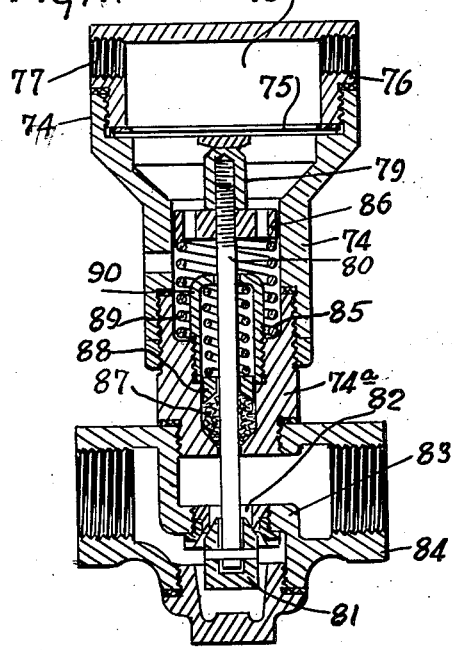
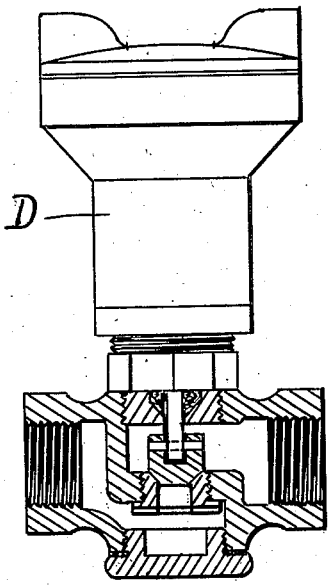
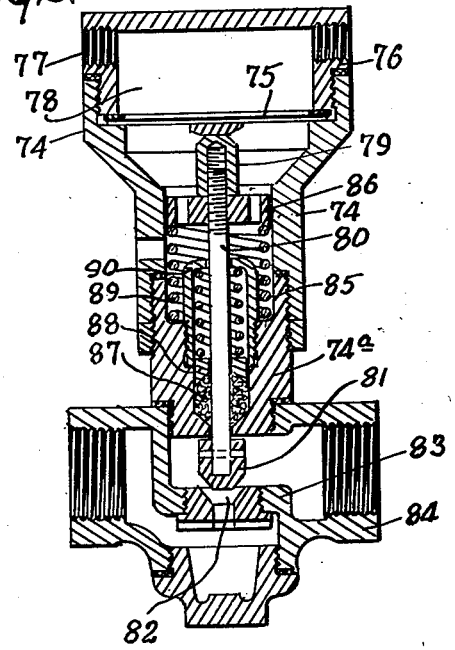
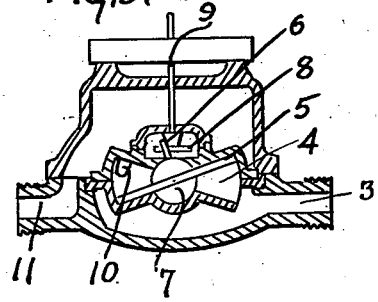

Patented Dec. 11, 1928.

1,694,467

UNITED STATES PATENT OFFICE.

CHARLES P. EISENHAUER, OF DAYTON, OHIO, ASSIGNOR TO THE DURO COMPANY, OF DAYTON, OHIO, A CORPORATION OF OHIO.

FILTER.

Application filed August 18, 1925. Serial No. 51,015.

My invention relates to filters, and in particular to an automatic washing of the filter.

It is the object of my invention to provide an apparatus for automatically filtering water and for washing the filtering material.

In particular, it is my object to provide a system in which the alternate periods of the filtering and washing of the filtering material are determined by the amount of incoming water to be filtered, which water operates a controlling mechanism only. When the controlling mechanism is operated, the hydrostatic pressure of the incoming water is utilized to do the work of reversing the system from filtering to washing position and vice versa.

It is a further object in this connection to provide downward filtering and upward washing.

It is an additional object to provide a pair of screens on either side of the filtering material to enable this operation to take place with the maximum efficiency without losing any of the filtering material.

Referring to the drawings:—

Figure 2 is a side elevation partially in section of the meter and the operating mechanism;

Figure 3 is a detail view partially in section of the controlling mechanism and of the control valve;

Figure 4 is a side elevation of the cam and gear mechanism for operating the needle valve control;

Figure 5 is a section on the line 5—5 of Figure 4;

Figure 6 is a rear elevation partially in section of the meter and meter driving mechanism;

Figure 7 is a section through the "B" valve in the bottom line to the tank;

Figure 8 is a section through the "A" or service valve. The same valve is used as a "C" valve;

Figure 9 is a section through the meter operating mechanism;

Figure 10 is a detail sectional view of the drain valve "D".

Figure 1:
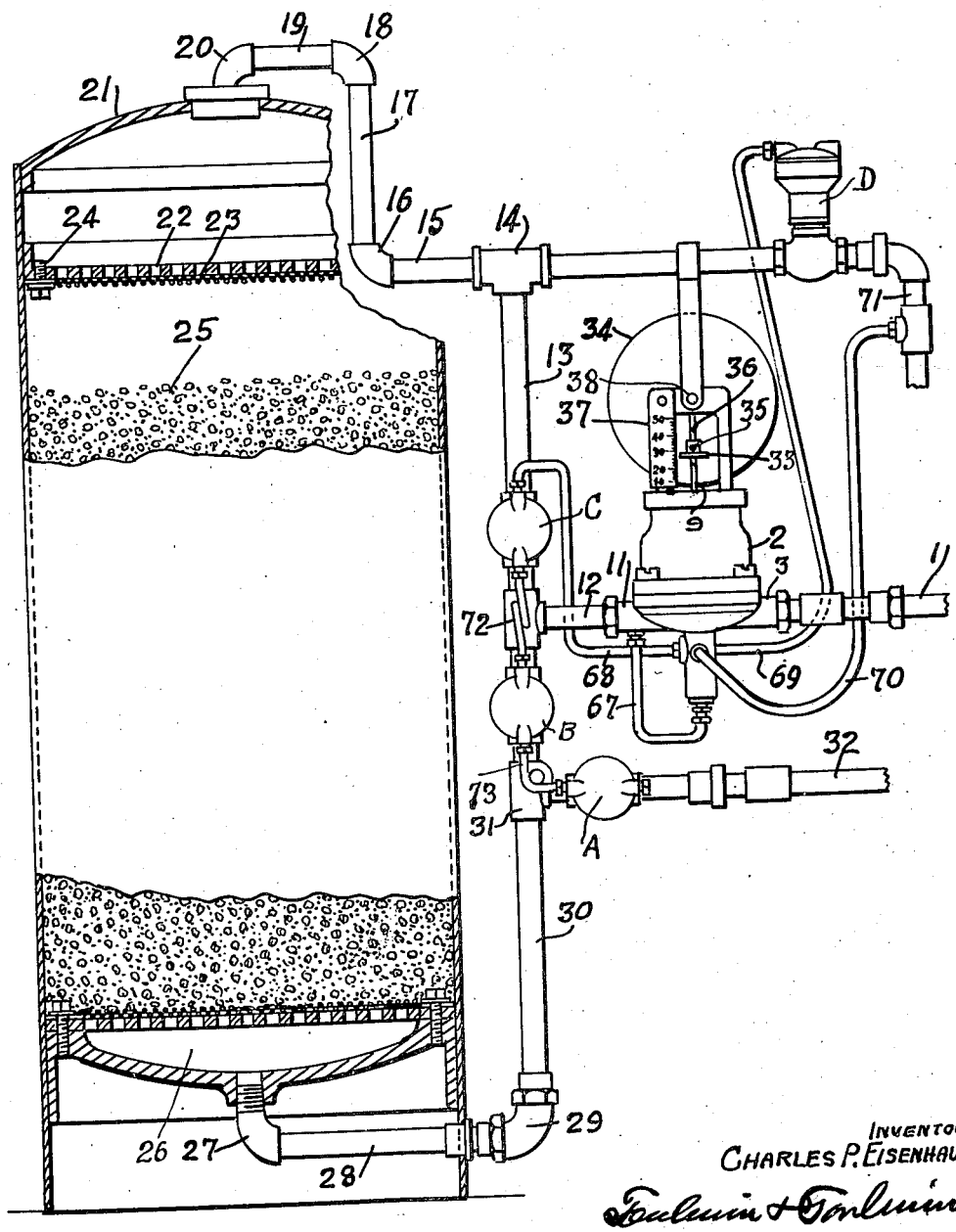
Figure 1 is an elevation of the mechanism with the filtering tank partially in section.

Referring to the drawings, 1 is an incoming water pipe having water therein under pressure, which passes into the meter casing 2 through the inlet passageway 3 into the chamber 4 where it actuates the plate 5 which carries a pin 6 on the ball 7. This pin engages with a lever 8 connected to the meter shaft 9.

The water then passes through the opening 10, pipe 11 to the pipe 12. It then passes upwardly past the "C" valve through the pipe 13, fitting 14, pipe 15, elbow 16, pipe 17, elbow 18, pipe 19, elbow 20 to the top of the tank 21. It then passes downwardly through the grating 22, screen 23 held in position in the tank by the bolts 24 to the filtering material 25 which rests on a similar screen and grating at the bottom of the tank. It then passes into the space 26, through the elbow 27, pipe 28, elbow 29, pipe 30, T 31, service valve "A" to the service line 32. This is the normal filtering pathway.

As the hard water passes through the pipe 1 into the meter and through the meter, it turns the shaft 9 to which is connected a driving member 33 engaging with a disc 34. The disc driving member may be adjusted by a cotter pin 35 in the holes 36 in the driving shaft 9, so that it will engage with the disc 34 at different distances from its periphery. The purpose of this adjustment is to adjust the period of filtering and washing. A scale 37 is provided for indicating this adjustment.

The disc 34 is mounted upon a shaft 38, one end of which is journaled in the bracket 39 and the other end of which is journaled in the bracket 40. This shaft 38 carries a worm 41 engaging with a worm wheel 42 carried on a worm wheel shaft 43. This shaft is journaled in the spaced upright support 44. It carries on it the gear 42 which is provided with an extended hub 45 carrying the set screws 46 for positioning the cam members 47 and 48. These cam members are mounted upon an extension of the hub 45 which is a sleeve 49. The gear is fixed to the shaft by a set screw 50.

Engaging with the cams is a cam roller 51 journaled on a cam follow arm 52 which is pivoted to an arm 54 at 55, such arm being carried on the upright support 44. The other end of this cam arm at 56 is connected to the needle valve stem 57. The movement of the valve stem through the cam follower arm by the cams is resisted by the helical spring 58 connected to the bracket 40 at one end and to the valve stem 57 at the other end.

These cams are adjustable in the following manner. The cam 47 is mounted upon a disc 59 which is eccentrically mounted on the sleeve 49. The eccentric disc 59 has slots 60 in which are located the set screws 46. By rotating the cam 47 on this eccentric disc the length of the projection of its high point with respect to the high point of the cam 48 may be also adjusted. The adjustment thus made may be fixed by the clamping action of the set screws 46. The eccentric disc 59 is slightly thinner than the cam 47 permitting this clamping operation. It is obvious in this arrangement that one cam may be hidden partially behind the other to facilitate the lengthening of the high spot of the two cams.

Turning to the needle valve which actuates the controlling means, it will be observed that the valve stem 57 passes through a casing 61 having a chamber 62 and through an aperture at 63 of the bottom thereof which is closed by a valve member 64 operating within a second chamber 65 in the casing 66 to which pressure is applied from the incoming water through the line 67. The chamber 62 has outlet pipes 68 and 69 and a drain pipe 70 communicating therewith having a restricted bleed opening 71 to permit the accumulation of liquid in the lines 68 and 69 and the diaphragm chambers with which they communicate and the chamber 62 to drain through the pipe 70.

The riding of the roller on the high point of the cam depresses the valve stem and opens the pressure through the pipe 67 into the pipes 68 and 69 thus admitting pressure behind the valves "A", "B", "C" and "D" to operate them, as hereinafter described.

For the purpose of convenience and designation, I designate the service line valve as "A" which is normally open during filtering and closed during washing. "B" is a valve closed during filtering and open during washing; it is located in the line 30. "C" is a valve normally open during filtering and closed during washing; it is located in the line 13. "D" is a valve located in the drain line and is normally closed during filtering and open during washing.

The pipe 68 communicates with the valves "C", "B" and "A", which are connected together by the pipes 72 and 73. The pipe 69 communicates with the valve "D" while the pipe 70 communicates with the drain pipe 71.

When the needle valve is open, the hydrostatic pressure closes valve "C", opens valve "B" and closes valve "A". Valve "D" is also open.

These valves are shown in some detail in Figures 7, 8, 9 and 10.

Referring to Figure 7 which is an illustration of a valve normally closed during filtering, that is, a valve of the "B" and "D" type, 74 is a casing in the upper end of which is mounted a diaphragm 75 beneath a screw top 76 with which hydrostatic pressure communicates through an opening 77 into the chamber 78. This diaphragm has engaged therewith the head 79 of a valve stem 80 carrying in its lower end a valve member 81.

This valve member closes an opening 82 in a partition 83 in the fitting 84. The valve stem is moved in one direction by the pressure behind the diaphragm and in the other direction by a spring 85 engaging with a shoulder of a part of the casing 74 designated 74ª and with a plate or disc 86 carried on the valve stem 80. A packing 87 is kept in position by a packing washer 88 and a spring 89, one end of which is enclosed by a cage 90.

The valve shown in Figure 8 is of the type normally open during filtering, such as valves "A" and "C". It is exactly similar in its parts to Figure 7 except that the valve member 81 seats when hydrostatic pressure is applied rather than is seated by the spring pressure, as in Figure 7.

It will be understood that I desire to comprehend within my invention such modifications as may be necessary to adapt it to varying conditions and uses.

Having thus fully described my invention, what I claim as new and desire to secure by Letters Patent, is:—

1. In a filtering apparatus, means for filtering, means for delivering fluid for filtering to one end of the apparatus and for delivering fluid for washing to the other end of the apparatus, and means for delivering water to a drain from the other end of the filter, and means controlled by the incoming water to be filtered for regulating the period of filtering and washing, means for controlling the delivery and exit of fluid through the several means hereinbefore recited and means to control the operation thereof which in turn is operated by the first-mentioned controlling means.

2. In a filtering apparatus, means for filtering, means for delivering fluid for filtering to one end of the apparatus and for delivering fluid for washing to the other end of the apparatus, means for draining water from the other end of the filter, a meter operated by the incoming water to the filter, a needle valve, and means for controlling the movement of the water through the aforementioned means, such controlling means being hydrostatically operated by water admitted through said needle valve at intervals controlled by the meter when it in turn operates the needle valve.

3. In a filtering apparatus, a filtering means to convey liquid to the filter to filter downwardly and out, a means at the bottom of the filter to convey the filtered liquid to service, means connected to the line leading to the top of the filter for draining the filter, a valve in the drain, a valve in the line leading to the top of the filter, a valve in the line leading to the bottom of the filter, a valve in the service line, a control valve hydrostatically connected to said valves and to the incoming water line, means actuated by the incoming water in the incoming water line for periodically operating the control valve to permit the introduction therein of hydrostatic pressure, whereby the filter is alternately used for filtering water in one direction and for washing the filter in the other direction, the filtered water going to service and the washing water going to the drain.

4. In a filtering apparatus, a filtering means to convey liquid to the filter to filter downwardly and out, a means at the bottom of the filter to convey the filtered liquid to service, means connected to the line leading to the top of the filter for draining the filter, a valve in the drain, a valve in the line leading to the top of the filter, a valve in the line leading to the bottom of the filter, a valve in the service line, a control valve hydrostatically connected to said valves and to the incoming water line, means actuated by the incoming water in the incoming water line for periodically operating the control valve to permit the introduction therein of hydrostatic pressure, whereby the filter is alternately used for filtering water in one direction and for washing the filter in the other direction, the filtered water going to service and the washing water going to the drain, a yielding means associated with each of said valves for restoring the valves to their initial position when hydrostatic pressure is removed therefrom.

5. In a filtering apparatus, a filtering means to convey liquid to the filter to filter downwardly and out, a means at the bottom of the filter to convey the filtered liquid to service, means connected to the line leading to the top of the filter for draining the filter, a valve in the drain, a valve in the line leading to the top of the filter, a valve in the line leading to the bottom of the filter, a valve in the service line, a control valve hydrostatically connected to said valves and to the incoming water line, means actuated by the incoming water in the incoming water line for periodically operating the control valve to permit the introduction therein of hydrostatic pressure, whereby the filter is alternately used for filtering water in one direction and for washing the filter in the other direction, the filtered water going to service and the washing water going to the drain, a yielding means associated with each of said valves for restoring the valves to their initial position when hydrostatic pressure is removed therefrom, and means to drain said control valve and the remainder of the valves when the hydrostatic pressure is relieved.

6. In a filtering apparatus, a filtering means to convey liquid to the filter to filter downwardly and out, a means at the bottom of the filter to convey the filtered liquid to service, means connected to the line leading to the top of the filter for draining the filter, a valve in the drain, a valve in the line leading to the top of the filter, a valve in the line leading to the bottom of the filter, a valve in the service line, a control valve hydrostatically connected to said valves and to the incoming water line, means actuated by the incoming water in the incoming water line for periodically operating the control valve to permit the introduction therein of hydrostatic pressure, whereby the filter is alternately used for filtering water in one direction and for washing the filter in the other direction, the filtered water going to service and the washing water going to the drain, a yielding means associated with each of said valves for restoring the valves to their initial position when hydrostatic pressure is removed therefrom, and means to drain said control valve and the remainder of the valves when the hydrostatic pressure is relieved, and means to adjust the period of filtering.

7. In a filtering apparatus, a filtering means to convey liquid to the filter to filter downwardly and out, a means at the bottom of the filter to convey the filtered liquid to service, means connected to the line leading to the top of the filter for draining the filter, a valve in the drain, a valve in the line leading to the top of the filter, a valve in the line leading to the bottom of the filter, a valve in the service line, a control valve hydrostatically connected to said valves and to the incoming water line, means actuated by the incoming water in the incoming water line for periodically operating the control valve to permit the introduction therein of hydrostatic pressure, whereby the filter is alternately used for filtering water in one direction and for washing the filter in the other direction, the filtered water going to service and the washing water going to the drain, a yielding means associated with each of said valves for restoring the valves to their initial position when hydrostatic pressure is removed therefrom, and means to drain said control valve and the remainder of the valves when the hydrostatic pressure is relieved, and means to adjust the period of filtering, and means to adjust the period of washing.

8. In a filtering apparatus, an incoming water line having one branch leading to the top of a filter tank and another branch leading to the bottom of a filter tank, means connected to the upper branch leading to a drain, means connected to the lower branch leading to service, valves in said branches and in said service and drain lines, a filter tank, screens spaced from the ends thereof with filtering material therebetween, a meter in the incoming hard water line adapted to be actuated thereby, means driven by said meter for operating a master control valve, a master control valve, means of admitting hydrostatic pressure thereto and conveying hydrostatic pressure therefrom to said valves to operate them in one direction, and yielding means to operate them in the other direction.

9. In a filtering apparatus, an incoming water line having one branch leading to the top of a filter tank and another branch leading to the bottom of a filter tank, means connected to the upper branch leading to a drain, means connected to the lower branch leading to service, valves in said branches and in said service and drain lines, a filter tank, screens spaced from the ends thereof with filtering material therebetween, a meter in the incoming hard water line adapted to be actuated thereby, means driven by said meter for operating a master control valve, a master control valve, means of admitting hydrostatic pressure thereto and conveying hydrostatic pressure therefrom to said valves to operate them in one direction, and yielding means to operate them in the other direction, said operating means for the master control valve by the meter consisting of a frictional driving mechanism and a cam and cam follow arm, the latter being attached to the stem of the master control valve, and yielding means to move said master control valve stem in the other direction from the direction it is moved by the high point of the cam.

10. In a filtering apparatus, an incoming water line having one branch leading to the top of a filter tank and another branch leading to the bottom of a filter tank, means connected to the upper branch leading to a drain, means connected to the lower branch leading to service, valves in said branches and in said service and drain lines, a filter tank, screens spaced from the ends thereof with filtering material therebetween, a meter in the incoming hard water line adapted to be actuated thereby, means driven by said meter for operating a master control valve, a master control valve, means of admitting hydrostatic pressure thereto and conveying hydrostatic pressure therefrom to said valves to operate them in one direction, and yielding means to operate them in the other direction, said operating means for the master control valve by the meter consisting of a frictional driving mechanism and a cam and cam follow arm, the latter being attached to the stem of the master control valve, and yielding means to move said master control valve stem in the other direction from the direction in which it is moved by the high point of the cam, means to adjust said cam to vary the length of its high point to vary the time the master control valve is open.

11. In a filtering apparatus, an incoming water line, a branch to the top of a filter tank, a branch to the bottom of a filter tank, a filter tank, filtering material therein, a line leading from the upper branch to a drain, a line leading from the lower branch to service, valves in said respective lines, a master control valve, means of conveying hydrostatic pressure therefrom to the other valves to actuate them, means to convey hydrostatic pressure from the main line to the control valve, means actuated by the incoming water for controlling the operation of the master control valve, said valves being provided with yielding means for actuating them in the directions opposite to that in which they are actuated by said hydrostatic means, said valves being so arranged that when the master control valve is closed the valve in the service line and in the upper branch will be open and the other valves will be closed, and when the master control valve is open, the valve in the service line will be closed, the valve in the lower branch will be open, the valve in the upper branch will be closed and the drain valve will be open in the drain line.

12. In a filtering apparatus, an incoming water line, a branch to the top of a filter tank, a branch to the bottom of a filter tank, a filter tank, filtering material therein, a line leading from the upper branch to a drain, a line leading from the lower branch to service, valves in said respective lines, a master control valve, means of conveying hydrostatic pressure therefrom to the other valves to actuate them, means to convey hydrostatic pressure from the main line to the control valve, means actuated by the incoming water for controlling the operation of the master control valve, said valves being provided with yielding means for actuating them in the directions opposite to that in which they are actuated by said hydrostatic means, said valves being so arranged that when the master control valve is closed, the valve in the service line and in the upper branch will be open and the other valves will be closed, and when the master control valve is open, the valve in the service line will be closed, the valve in the lower branch will be open, the valve in the upper branch will be closed and the drain valve will be open in the drain line, and means to drain said master control valve when it is closed, and means to drain the other valves.

13. In a filtering apparatus, an incoming water line, a branch to the top of a filter tank, a branch to the bottom of a filter tank, a filter tank, filtering material therein, a line leading from the upper branch to a drain, a line leading from the lower branch to service, valves in said respective lines, a master control valve, means of conveying hydrostatic pressure therefrom to the other valves to actuate them, means to convey hydrostatic pressure from the main line to the control valve, means actuated by the incoming water for controlling the operation of the master control valve, said valves being provided with yielding means for actuating them in the directions opposite to that in which they are actuated by said hydrostatic means, said valves being so arranged that when the master control valve is closed the valve in the service line and in the upper branch will be open and the other valves will be closed, and when the master control valve is open, the valve in the service line will be closed, the valve in the lower branch will be open, the valve in the upper branch will be closed and the drain valve will be open in the drain line, and means to drain said master control valve when it is closed, and means to drain the other valves, said filter tank being so arranged that the points of entry and exit of the water are spaced from screens in the filter tank which retain filtering material.

14. In a filtering apparatus, an incoming water line, a branch to the top of a filter tank, a branch to the bottom of a filter tank, a filter tank, filtering material therein, a line leading from the upper branch to a drain, a line leading from the lower branch to service, valves in said respective lines, a master control valve, means of conveying hydrostatic pressure therefrom to the other valves to actuate them, means to convey hydrostatic pressure from the main line to the control valve, means actuated by the incoming water for controlling the operation of the master control valve, said valves being provided with yielding means for actuating them in the directions opposite to that in which they are actuated by said hydrostatic means, said valves being so arranged that when the master control valve is closed, the valve in the service line and in the upper branch will be open and the other valves will be closed, and when the master control valve is open, the valve in the service line will be closed, the valve in the lower branch will be open, the valve in the upper branch will be closed and the drain valve will be open in the drain line, and means to drain said master control valve when it is closed, and means to drain the other valves, said master control valve consisting of a pair of spaced chambers with a partition therebetween closed by a valve member on the valve stem of the control valve, one of said chambers being connected to the incoming water line and the other of said chambers being connected to the valves and to a drain line with a restricted orifice.

In testimony whereof, I affix my signature.

CHARLES P. EISENHAUER.